United States Patent
High et al.

(10) Patent No.: US 10,242,338 B2
(45) Date of Patent: Mar. 26, 2019

(54) SYSTEMS AND METHODS FOR MANAGING AN INVENTORY OF PRODUCTS PURCHASED BY CUSTOMERS FROM A RETAILER

(71) Applicant: Walmart Apollo, LLC, Bentonville, AR (US)

(72) Inventors: Donald R. High, Noel, MO (US); Courtland J. Halbrook, Centerton, AR (US); Joseph W. Hendricks, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 99 days.

(21) Appl. No.: 15/463,175

(22) Filed: Mar. 20, 2017

(65) Prior Publication Data

US 2017/0270472 A1  Sep. 21, 2017

Related U.S. Application Data (60) Provisional application No. 62/310,535, filed on Mar. 18, 2016.

(51) Int. Cl.
*G06Q 10/00* (2012.01)
*G06Q 10/08* (2012.01)
*G06Q 30/06* (2012.01)

(52) U.S. Cl.
CPC ......... *G06Q 10/087* (2013.01); *G06Q 10/083* (2013.01); *G06Q 30/0623* (2013.01); *G06Q 30/0633* (2013.01)

(58) Field of Classification Search
CPC ................................ G06Q 10/00; G06Q 10/08
(Continued)

(56) References Cited

U.S. PATENT DOCUMENTS 6,974,928 B2 * 12/2005 Bloom ................ B07C 3/00
                                                   209/583
6,982,640 B2 *  1/2006 Lindsay .......... G06K 17/0022
                                                   340/10.1
(Continued)

FOREIGN PATENT DOCUMENTS

EP         2954806      12/2015
WO      2005108884      11/2005

OTHER PUBLICATIONS

PCT; App. No. PCT/US2017/23160; International Search Report and Written Opinion dated Jun. 9, 2017.

*Primary Examiner* — Oluseye Iwarere
(74) *Attorney, Agent, or Firm* — Fitch, Even, Tabin & Flannery LLP (57) ABSTRACT

In some embodiments, methods and systems are provided that permit a customer to purchase one or more products but not take possession of the products or cause delivery of the products at the time of the purchase order. The products are then stored at one or more product storage locations of the retailer while being marked as purchased by the customer in an inventory management database of the retailer. The customer is provided with a customer interface including a plurality of input fields configured to allow the customer to define one or both of: a delivery time period and a delivery destination for delivery of at least a portion of the products purchased by the customer; and a pickup location and a pickup time period for at least a portion of the products purchased by the customer.

20 Claims, 3 Drawing Sheets (58) Field of Classification Search
USPC .................................................. 705/28, 26.2
See application file for complete search history.

(56) References Cited

U.S. PATENT DOCUMENTS

| | | | | |
|---|---|---|---|---|
| 7,177,825 B1* | 2/2007 | Borders | ............. | G06Q 10/0631 705/26.81 |
| 7,257,552 B1* | 8/2007 | Franco | ................... | G06Q 10/08 705/26.2 |
| 7,673,464 B2* | 3/2010 | Bodin | .................... | G06Q 10/08 347/141 |
| 8,150,735 B2* | 4/2012 | Walker | ............... | G06Q 30/0621 705/26.1 |
| 9,633,389 B2* | 4/2017 | Carr | .................... | G06Q 30/0633 |
| 2001/0042024 A1* | 11/2001 | Rogers | ............... | G06Q 10/0637 705/26.81 |
| 2001/0047306 A1* | 11/2001 | Garretson | ............ | G06Q 10/087 705/20 |
| 2002/0099614 A1* | 7/2002 | Krech | ................ | G06Q 10/0637 705/7.36 |
| 2003/0177072 A1* | 9/2003 | Bared | .................... | G06Q 30/06 705/26.81 |
| 2003/0200148 A1* | 10/2003 | Razumov | ........... | G06Q 10/0637 705/7.36 |
| 2004/0249497 A1* | 12/2004 | Saigh | ...................... | E04H 14/00 700/216 |
| 2005/0192834 A1* | 9/2005 | Yates, Jr. | ............... | G06Q 20/10 705/39 |
| 2007/0187183 A1* | 8/2007 | Saigh | ...................... | E04H 14/00 186/53 |
| 2008/0250797 A1* | 10/2008 | Rozendaal | .............. | F25D 29/00 62/127 |
| 2010/0138037 A1* | 6/2010 | Adelberg | ............. | G06Q 10/087 700/241 |
| 2011/0125566 A1* | 5/2011 | McLaughlin | .......... | G06Q 20/20 705/14.23 |
| 2012/0191522 A1* | 7/2012 | McLaughlin | .......... | G06Q 50/01 705/14.23 |
| 2013/0261792 A1* | 10/2013 | Gupta | .................... | G06Q 10/08 700/232 |
| 2014/0279294 A1* | 9/2014 | Field-Darragh | ..... | G06Q 10/087 705/28 |
| 2015/0106293 A1* | 4/2015 | Robinson | ................ | G06F 21/62 705/339 |
| 2015/0227882 A1* | 8/2015 | Bhatt | ................... | G06Q 10/083 705/330 |
| 2015/0339625 A1* | 11/2015 | Agasti | ................ | G06Q 10/0836 705/26.81 |
| 2015/0356667 A1* | 12/2015 | Poole | ................. | G06Q 30/0639 705/26.81 |
| 2016/0350787 A1* | 12/2016 | Taylor | ................ | G06Q 30/0223 |
| 2017/0011449 A1* | 1/2017 | Mueller | ............ | G06Q 30/0635 |
| 2017/0024804 A1* | 1/2017 | Tepfenhart, Jr. | ... | G06Q 30/0635 |
| 2017/0024805 A1* | 1/2017 | Tepfenhart, Jr. | ... | G06Q 30/0635 |
| 2017/0220986 A1* | 8/2017 | Putcha | ................. | G06O 10/087 |
| 2017/0270472 A1* | 9/2017 | High | ................... | G06Q 10/083 |

\* cited by examiner

SYSTEMS AND METHODS FOR MANAGING AN INVENTORY OF PRODUCTS PURCHASED BY CUSTOMERS FROM A RETAILER

RELATED APPLICATIONS

This application claims the benefit of U.S. Provisional Application No. 62/310,535, filed Mar. 18, 2016, which is incorporated herein by reference in its entirety.

TECHNICAL FIELD

This invention relates generally to managing product inventory and, in particular, to systems and methods for managing storage of products for customers after the products are purchased by the customers.

BACKGROUND

Customers often purchase products from retailers over the internet. Generally, the products purchased by a customer are delivered to an address provided by the customer. Some customers of retailers are small businesses, and depend on a steady stream of replenishment products, but do not have adequate storage space capacity for the replenishment products. Such customers often rely on separate storage spaces to store the replenishment products. Such storage spaces add to operation cost and are inconvenient because they are remote to the customers' business location.

BRIEF DESCRIPTION OF THE DRAWINGS

Disclosed herein are embodiments of systems, apparatuses, methods, and systems pertaining to managing an inventory of products purchased by a customer from a retailer. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for enabling a customer to purchase one or more products from a retailer and not take possession of the purchased product(s), but to permit the retailer to store the product(s) for the customer until a time when the customer chooses to take possession of the product(s). The customer is permitted to manage storage, delivery, and/or pick up options relative to the product(s) purchased from the retailer via a graphical customer access interface.

In one embodiment, a system of managing an inventory of products purchased by a customer from a retailer includes an order processing server of the retailer configured to process a purchase order by a customer for a plurality of products. The customer does not take possession of the plurality of products or cause delivery of the plurality of products at the time of the purchase order. The order processing server is configured to generate a graphical interface configured to permit the customer to select at least one storage location of the retailer for storing the plurality of products being purchased by the customer, duration of storage of the plurality of products being purchased by the customer at the selected at least one storage location of the retailer, and storage conditions for storing the plurality of products being purchased by the customer at the selected at least one storage location of the retailer. The order processing server is also configured to generate a price for the plurality of products based on the at least one storage location, duration of storage, and storage conditions selected by the customer. The system further includes an inventory management database configured to store electronic data associated with the plurality of products purchased by the customer, the plurality of products purchased by the customer at the price generated by the order processing server being marked in the inventory management database of the retailer as being purchased by the customer. The plurality of products marked as being purchased by the customer are stored at the at least one storage location of the retailer selected by the customer, for the storage duration selected by the customer, and at the storage conditions selected by the customer until subsequent delivery to the customer or pickup by the customer. The system further includes a customer access interface including a plurality of input fields configured to allow the customer to define one or both of: a delivery time period and a delivery destination for delivery of at least a portion of the plurality of products; and a pickup location; and a pickup time period for at least a portion of the plurality of products.

In another embodiment, a method of managing an inventory of products purchased by a customer from a retailer includes: processing, at an order processing server of the retailer, a purchase order by a customer for a plurality of products, wherein the customer does not take possession of the plurality of products or cause delivery of the plurality of products at the time of the purchase order; generating, via the order processing server, a graphical interface configured to permit the customer to select at least one storage location of the retailer for storing the plurality of products being purchased by the customer, duration of storage of the plurality of products being purchased by the customer at the selected at least one storage location of the retailer, and storage conditions for storing the plurality of products being purchased by the customer at the selected at least one storage location of the retailer; generating, via the order processing server, a price for the plurality of products based on the at least one storage location, duration of storage, and storage conditions selected by the customer; marking, in an inventory management database of the retailer, the plurality of products as being purchased by the customer at the price generated via the order processing server, the plurality of products marked as being purchased by the customer being stored at the at least one storage location of the retailer selected by the customer, for the storage duration selected by the customer, and at the storage conditions selected by the customer until subsequent delivery to the customer or pickup by the customer; and providing a customer interface including a plurality of input fields configured to allow the customer to define one or both of: a delivery time period and a delivery destination for delivery of at least a portion of the plurality of products; and a pickup location and a pickup time period for at least a portion of the products.

In yet another embodiment, a system of managing an inventory of products purchased by a customer from a retailer includes means processing a purchase order by a customer for a plurality of products. The customer does not take possession of the plurality of products or cause delivery of the plurality of products at the time of the purchase order. The means for processing is configured to: generate a graphical interface configured to permit the customer to select at least one storage location of the retailer for storing the plurality of products being purchased by the customer, duration of storage of the plurality of products being purchased by the customer at the selected at least one storage location of the retailer, and storage conditions for storing the plurality of products being purchased by the customer at the selected at least one storage location of the retailer. The means for processing is further configured to generate a price for the plurality of products based on the at least one storage location, duration of storage, and storage conditions selected by the customer. The system further includes means for marking the plurality of products as being purchased by the customer, the plurality of products marked as being purchased by the customer at the price generated by the means for processing being stored at the at least one storage location of the retailer selected by the customer, for the storage duration selected by the customer, and at the storage conditions selected by the customer until subsequent delivery to the customer or pickup by the customer. The system further includes means for allowing the customer to define one or both of: a delivery time period and a delivery destination for delivery of at least a portion of the plurality of products; and a pickup location and a pickup time period for at least a portion of the plurality of products.

Figure 1:
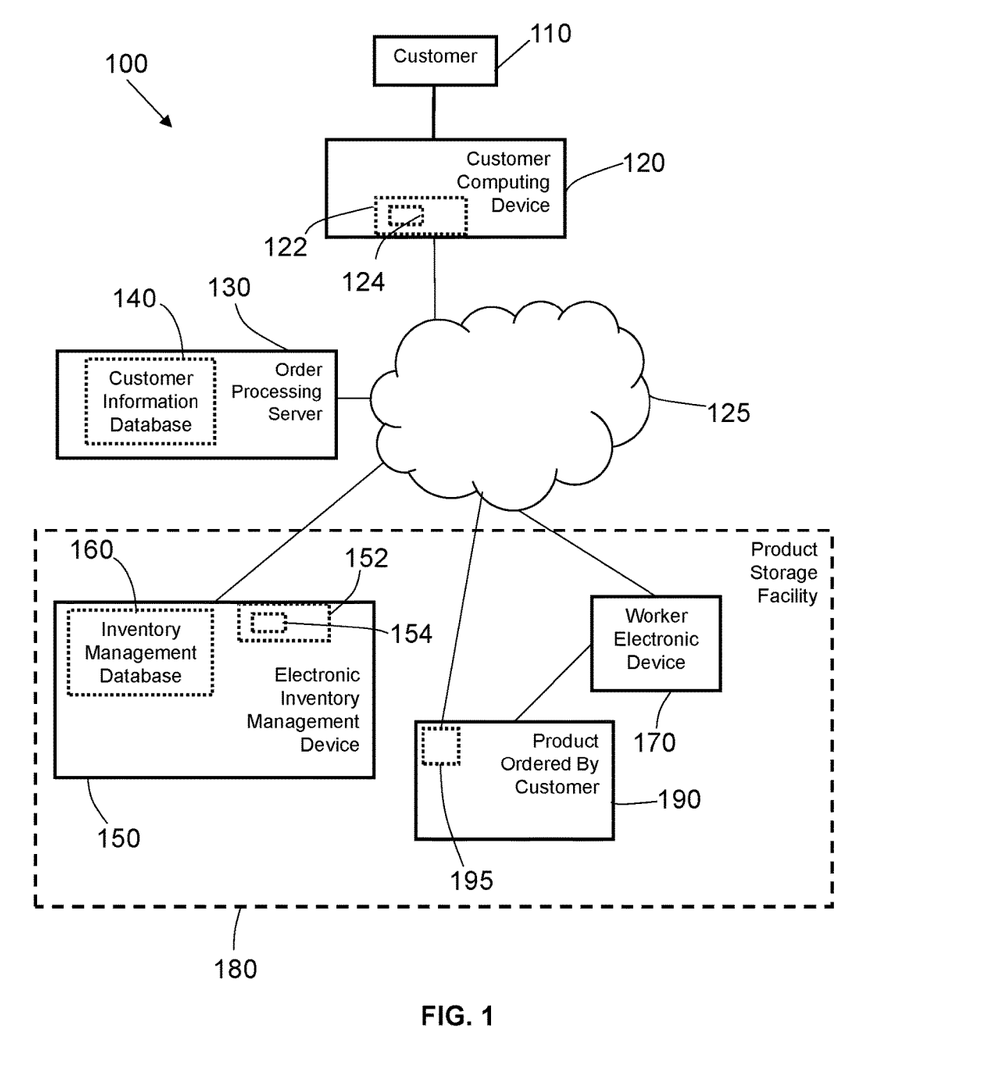
FIG. 1 is a diagram of a system of managing inventory of products purchased by a customer from a retailer and stored by the retailer for the customer in accordance with some embodiments.

FIG. 1 shows an embodiment of a system 100 for managing an inventory of products 190 purchased by a customer 110 from a retailer. The retailer may be any entity operating as a brick-and-mortar physical location and/or a website accessible via the internet by way of which products may be ordered by a customer 110. A customer 110 may be an individual or business entity. Exemplary products that may be ordered by the customer 110 via the system 100 may include, but are not limited to, general-purpose customer goods, as well as consumable products, such as medications, food items, and dietary supplements.

The exemplary system 100 of FIG. 1 includes an order processing server 130 of the retailer configured to process a purchase order by the customer 110 for one or more products 190. The order processing server 130 may be implemented as one server at one location, or as multiple interconnected servers stored at multiple locations operated by or for the retailer. As described in more detail below, the order processing server 130 may communicate with one or more devices of system 100 via a network 125. The network 125 may be a wide-area network (WAN), a local area network (LAN), a personal area network (PAN), a wireless local area network (WLAN), or any other internet or intranet network, or combinations of such networks. Generally, communication between variously electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. In some embodiments, the customer information database 140 may be configured to store information associated with a customer 110 who orders products 190 from the retailer. In some embodiments, the customer information database 140 may store electronic information associated with the customer 110, such as the customer's personal information, product order history, pending order status, product order options, and product storage, delivery, and/or pick-up options. The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based.

In some embodiments, the order processing server 130 may be also coupled to an electronic database storing information associated with the inventory of products 190 available to the customer 110 for purchase from the retailer. In other words, while the order processing server 130 is illustrated in FIG. 1 as being coupled to one database (i.e., the customer information database 140), it will be appreciated that the order processing server 130 may be coupled to or physically incorporate two or more databases configured to store customer information (e.g., customer information database 140) and/or product inventory information (e.g., inventory management database 160). While the customer information database 140 and the inventory management database 160 are illustrated as two separate databases, it will be appreciated that the customer information database 140 and the inventory management database 160 can be incorporated into one device in one location. The customer 110 may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130.

In some embodiments, after placing an on order for one or more products 190 via the order processing server 130 using the customer computing device 120, the customer 110 does not take possession of the purchased products 190 and does not request immediate delivery of the products 190.

Instead, the products 190 ordered by the customer 110 are stored for the customer 110 at a product storage facility 180 of the retailer as discussed in more detail below. In some embodiments, the order processing server 130 is configured to receive and process an order by a customer 110 for a product 190 from the customer computing device 120, to receive and process payment for the product 190 from the customer 110, and to transmit a product storage request based on the processed order (e.g., via the network 125) to an electronic inventory management device 150 at a product storage facility 180 of the retailer associated with the geographic location of the customer 110 who placed the order. It will be appreciated that while the order processing server 130 and the electronic inventory management device 150 may be located at separate physical locations (e.g., regional/central data center, product storage facility 180, or the like), the system 100, in some aspects, may be confined to a single product storage facility 180 of the retailer.

Figure 2:
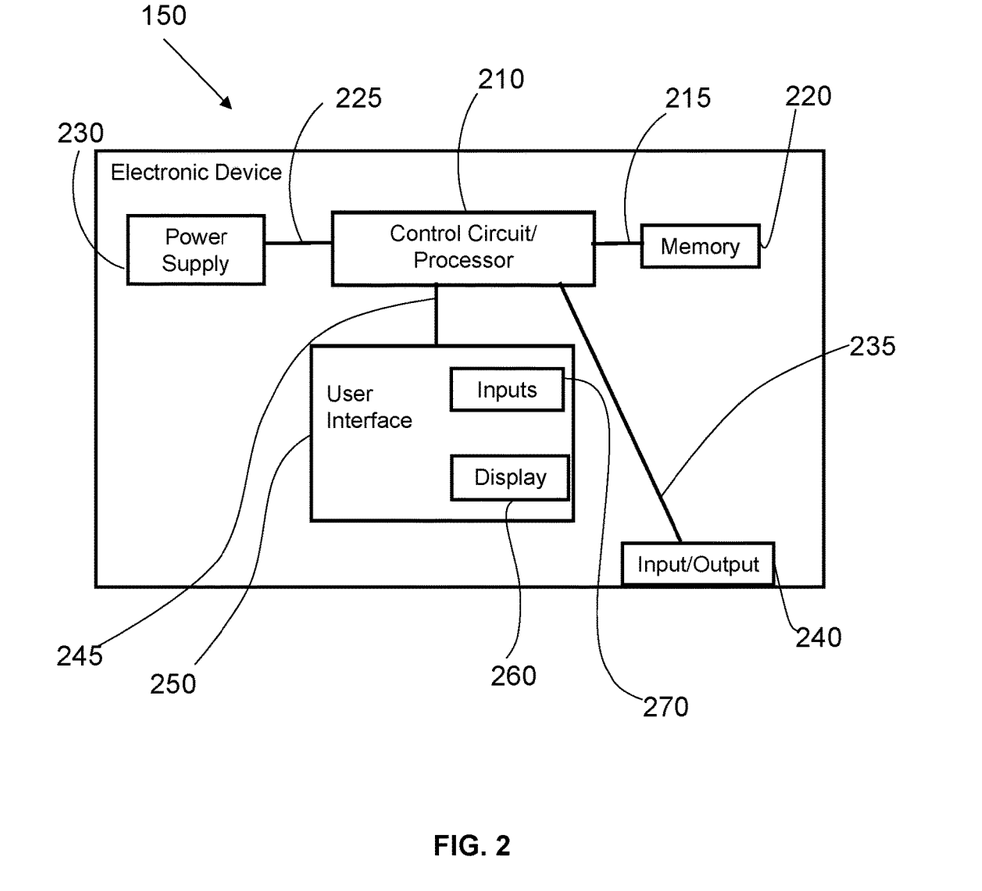
FIG. 2 is a functional diagram of an exemplary electronic inventory management device usable with the system of FIG. 1 in accordance with some embodiments.

The electronic inventory management device 150 located at the product storage facility 180 of the retailer may be a stationary or portable electronic device, for example, a desktop computer, a laptop computer, a tablet, a mobile phone, or any other electronic device including a processor-based control circuit (i.e., control unit). In the embodiment of FIG. 1, the electronic inventory management device 150 is configured for data entry and processing as well as for communication with other devices of system 100 via the network 125 which, as described above, may be a wide-area network (WAN), a local area network (LAN), a personal area network (PAN), a wireless local area network (WLAN), or any other internet or intranet network, or combinations of such networks. With reference to FIG. 2, an exemplary electronic inventory management device 150 configured for use with exemplary systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the electronic inventory management device 150 is also electrically coupled via a connection 235 to an input/output 240 that can receive signals from the order processing server 130 (e.g., data from the customer information database 140 relating to a product order placed by the customer 110) or from any other source that can communicate with the electronic inventory management device 150 via a wired or wireless connection. The output 240 of the customer computing device 120 can also send signals to the order processing server 130 (e.g., data including product out-of-stock information regarding the product for which an order is placed by the customer 110 via the order processing server 130), or to any other device in wired or wireless communication with the electronic inventory management device 150.

In the embodiment shown in FIG. 2, the processor-based control unit 210 of the electronic inventory management device 150 is electrically coupled via a connection 245 to a user interface 250, which may include a visual display or display screen 260 (e.g., LED screen) and/or button input 270 that provide the user interface 250 with the ability to permit an operator of the electronic inventory management device 150 to manually control the electronic inventory management device 150 by inputting commands via touch-screen and/or button operation and/or voice commands to, for example, set one or more business rules with respect to a product 190 stored at a product storage facility 180. It will be appreciated that the performance of such functions by the processor-based control unit 210 of the electronic inventory management device 150 is not dependent on a human operator, and that the control unit 210 may be programmed to perform such functions without a human operator.

In some embodiments, the display screen 260 of the customer computing device 120 is configured to display various graphical interface-based menus, options, and/or alerts that may be transmitted from the electronic inventory management device 150 to, and displayed on, the customer computing device 120 in connection with various aspects of the order placed by the customer 110. The inputs 270 of the electronic inventory management device 150 may be configured to permit an operator to navigate through the on-screen menus on the electronic inventory management device 150 and make changes and/or updates to the product orders and/or to the storage options for the products 190 ordered by the customer and stored at the product storage facility 180. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the electronic inventory management device 150 may be programmed to generate customer alerts in connection with the products ordered by the customer 110 via the order processing server 130. The customer alerts may be generated by the electronic inventory management device 150 based on information received from the order processing server 130 and/or from the customer information database 140 and/or from the inventory management database 160. In the embodiment shown in FIG. 1, the customer alerts may be transmitted from the electronic inventory management device 150 via the network 125 to the customer computing device 120, and the customer computing device 120 may transmit data responsive to the customer alerts and/or other data to the electronic inventory management device 150 via the network 125. For example, the electronic inventory management device 150 may transmit a signal over the network 125 to the customer computing device 120 indicating that the product 190 being stored at the product storage facility 180 has expired, and that a replenishment product 190 has been ordered but will arrive to the product storage facility 180 in three days. In some embodiments, customer alerts sent to the customer computing device 120 may include but is not limited to short message service (SMS) messages, electronic mail (email) messages, voice mail messages, and/or push notifications (to a mobile application installed on the customer computing device 120).

In some embodiments, the control unit 210 of the electronic inventory management device 150 may be programmed to send an electronic query (e.g., via SMS, email, push notification, or the like) to the customer computing device 120. For example, such an electronic query may accompany an electronic customer alert indicating that the temperature storage requirement for the product 190 has not been met at the product storage facility 180, and asking the customer 110 to respond via a graphical retailer access interface 152 on a display screen of the customer computing device 120 by indicating whether the customer 110 is still willing to accept delivery of this product 190. The customer 110 may then use the computing device 120 to respond to this query by indicating that the customer 110 is still willing to accept delivery of such a product, or to request that the retailer replenish such a product 190 with another, identical product 190.

In some embodiments, the electronic inventory management device 150 at the product storage facility 180 may itself receive alert signals with respect to one or more products 190 being stored for the customer 110 at the product storage facility 180. For example, in some embodiments, an alert signal received by the electronic inventory management device 150 may indicate that a product 190 stored at the product storage facility 180 is being stored at storage conditions not acceptable for that product 190 (e.g., temperature too high or too low). Such an alert may be an audible alert (e.g., a beep) or a visual alert (e.g., text-based message) that may be received at the electronic inventory management device 150.

In the embodiment shown in FIG. 1, the electronic inventory management device 150 is coupled to an inventory management database 160. The electronic inventory management device 150 and the inventory management database 160 may be implemented as a single device at the product storage facility 180 retailer as illustrated in FIG. 1. It will be appreciated, however, that the electronic inventory management device 150 and the inventory management database 160 may be separate devices, and may be located at different physical locations. In some embodiments, the inventory management database 160 may be stored, for example, on non-volatile storage media (e.g., a hard drive, flash drive, or removable optical disk) internal or external to the electronic inventory management device 150, or internal or external to computing devices separate and distinct from the electronic inventory management device 150. In some embodiments, the inventory management database 160 may be cloud-based.

The exemplary inventory management database 160 of FIG. 1 is configured to store electronic data associated with the products 190 ordered by the customer 110 and being stored for the customer 110 at the product storage facility 180. Some exemplary electronic data that may be stored in the inventory management database 160 is discussed below. In some embodiments, the inventory management database 160 store electronic data indicating an inventory of available storage space (including location) and descriptions of the available storage space at the product storage facility 180. For example, such descriptions of the available storage space at the product storage facility 180 may indicate the type of space (e.g., freezer, cooler, ambient, shelf, bin, pallet), and may be in the form of a grid-like map that indicates available storage space for products 190.

In some embodiments, the customer 110 may access, review, and/or update the electronic data in the inventory management database 160 via a graphical customer access interface 122 displayed to the customer 110 on the customer computing device 120. The graphical customer access interface 122 may include one or more graphical input fields 124 in the form of menu options and/or sub-interfaces that permit the customer 110 to manage storage and/or delivery options for one or more products 190 ordered by the customer 110 via the order processing server 130 and stored for the customer 110 at the product storage facility 180.

For example, the graphical customer access interface 122 may permit the customer 110 to update the customer's account information, alert notifications, as well as storage location and/or temperature and/or delivery and/or pick-up options for one or more products 190 stored at the product storage facility 180. In some embodiments, the graphical customer access interface 122 may permit the customer 110 to view electronic information pertaining to the products 190 purchased by the customer 110 and stored at a product storage facility 180 of the retailer, including, but not limited to: inventory of stored products 190 (e.g., types of products 190 stored, number of products 190 stored); initial date the product 190 was stored at the product storage facility 180; expiration and/or "use by" date of the product 190 stored at the product storage facility 180; special instructions (temperature storage requirement, etc.) pertaining to the products; and physical location of the products 190 at the product storage facility 180.

In some aspects, the graphical customer access interface 122 includes input fields 124 that permit the customer 110 to set and/or modify delivery and/or pick-up and/or alert options for one or more products 190 stored for the customer 110 at the product storage facility 180. For example, the customer 110 may utilize the graphical customer access interface 122 to: define a specific delivery date on which products 190 are to be delivered to the customer 110; define an interval for periodic delivery of the product 190 to the customer 110; define an entity (e.g., a business or person) other than the customer 110 to which the products 190 are to be delivered; define one or more products 190 that are to be picked up from the product storage facility 180; define replenishment options (e.g., at periodic intervals or based on number of units in inventory) for the products 190 at the product storage facility 180; and set a minimum number of units of a product 190 in inventory when to generate a replenishment alert or replenishment request.

In some embodiments, in response to the customer 110 entering and/or changing the customer's product storage and/or product delivery options via the graphical customer access interface 122, the customer computing device 120 is configured to send a request to the inventory management database 160 (e.g., directly or via the electronic inventory management device 150) to update the electronic data stored in association with the customer 110 to reflect the changes by the customer 110 via the graphical customer access interface 122. In other embodiments, in response to the customer 110 entering and/or changing the customer's personal information via the graphical customer access interface 122, the computing device 120 is configured to send a request to the customer information database 140 (e.g., directly or via the order processing server 130) to update the electronic data stored in association with the customer 110 to reflect the changes by the customer 110 via the graphical customer access interface 122.

In some embodiments, the graphical customer access interface 122 on the customer computing device 120 may be a mobile application (app) associated with the retailer and configured to display various above-described menu options, notifications, and/or alerts for the customer 110. For example, electronic alerts may be transmitted to the customer computing device 120 from the electronic inventory management device 150 and/or from the order processing server 130. For example, one alert that may be displayed by the graphical customer access interface 122 on the computing device 120 of the customer 110 is a notification (sent via SMS or e-mail) of temporary unavailability of a product 190 ordered by the customer 110 and stored at the product storage facility 180 (e.g., when the product 190 ordered by the customer 110 and stored at the product storage facility 180 was purchased by and delivered to another customer 110 indicating a more immediate need for a delivery when ordering the product 190).

In some embodiments, as a customer 110 is attempting to place an order for a product 190 via the order processing server 130, the graphical customer access interface 122 on the customer computing device 120 is configured to permit the customer 110 to access the inventory management database 160 via a graphical interface generated by the order processing server 130 in order to get access to a listing of available space and type of space at the product storage facility 180 where the product 190 ordered by the customer 110 can be stored, and to select, within the graphical customer access interface 122 and via the graphical interface generated by the order processing server 130, an available storage space at the product storage facility 180 where the product 190 will be stored. The inventory management database 160 is configured for real-time tracking of the inventory of available storage space at the product storage facility 180 and for real-time tracking of the inventory of products 190 stored at the product storage facility 180. In some aspects, the graphical customer access interface 122 on the customer computing device 120 is configured to permit the customer 110, via a graphical interface generated by the order processing server 130, to select a required storage duration (1 day, 3 days, 5 days, 1 week, 2 weeks, 3 weeks, etc.) for the product 190 at the selected storage location 180; storage conditions required for the product 190 (e.g., freezer, refrigeration, specific temperature range, vacuum isolation, soft padding, etc.); a type of product 190 specified by the customer (e.g., frozen, fresh, perishable, toxic, flammable, breakable, etc.); a total number of units of the products 190 being purchased by the customer (e.g., for bulk discount considerations); and delivery options selected by the customer 110 for the products 190 (e.g., worker, delivery services, unmanned aerial vehicle, etc.).

In some embodiments, after the customer 110 selects the desired parameters (e.g., available storage space, storage conditions, and storage duration, etc.), the order processing server 130 is configured to transmit such parameters over the network 125 to the inventory management database 160 (either directly or via the electronic inventory management device 150) for storage. As such, the inventory management database 160 is configured for real-time tracking of the product storage parameters selected by the customer 110 when attempting to purchase one or more products 190 via the order processing server 130. In one aspect, the order processing server 130 is configured to transmit such parameters over the network 125 to the electronic inventory management device 150, the control circuit 210 of which is programmed to analyze these parameters and to generate a price for the products 190 by factoring in at least one of the following factors: available space at the selected storage location 180 and/or proximity of the selected storage location 180 to the customer 110; storage duration required for the product 190; storage conditions required for the product 190; a type of product 190 specified by the customer; a total number of units of the products 190 being purchased by the customer; and delivery options selected by the customer 110 for the products 190.

In some aspects, the control circuit 210 of the electronic inventory management device 150 is configured to generate a higher price for the products 190 in response to a determination by the order processing server 130 that the product type associated with the products 190 corresponds to a product type requiring specialized storage facilities and/or storage conditions resulting in a higher cost to the retailer. In some aspects, the electronic inventory management device 150 is configured to increase the generated price incrementally in response to incremental increases by the customer 110 of storage duration requirements for the purchased products 190 (e.g., $10/week, $20/weeks, $50/5 weeks, etc.). In some aspects, the electronic inventory management device 150 is configured to increase the generated price incrementally in response to incrementally more expensive delivery options for the retailer (e.g., $10/ground delivery within 3 days, $20/air delivery within 1 day, etc.). In some aspects, the electronic inventory management device 150 is configured to decrease the generated price incrementally in response to incrementally larger number of units of the products 190 being ordered by the customer 110 (e.g., $100/100 units, $900/1000 units, etc.).

After the electronic inventory management device 150 generates a price for the products 190 by analyzing the customer-selected product storage/delivery/pickup parameters discussed above, the electronic inventory management device 150 is configured to transmit the generated price to the inventory management database 160 for storage in association with the customer 110 and in association with the product storage/delivery/pickup parameters selected by the customer 110. In some embodiments, after the electronic inventory management device 150 generates the price for the products 190 as discussed above, the electronic inventory management device 150 transmits this price to the order processing server 130, which in turn displays, via the graphical interface generated by the order processing server 130 and via the graphical customer access interface 122, the parameter-based product price generated by the electronic inventory management device 150 to the customer 110, at which point the customer 110 can accept this price and place the order for the products 190 via the order processing server 130.

In some embodiments, the storage of the generated prices in association with various combination of customer-selected product storage/delivery/pickup parameters enables a machine-learning function of the electronic inventory management device 150. In other words, the storage of the generated prices in association with various combination of customer-selected product storage/delivery/pickup parameters in the inventory management database 160 permits the electronic inventory management device 150, when presented by a subsequent customer 110 with a combination of product storage/delivery/pickup parameters that are already stored in the inventory management database 160 in association with a previously-generated product price, to skip the price-generating analysis and calculation, but instead to simply retrieve, from the inventory management database 160, the product price previously generated by the electronic inventory management device 150 based on such parameters, thereby increasing the operating efficiency and processing speed of the electronic inventory management device 150.

In the embodiment of FIG. 1, the system 100 includes a worker electronic device 170 configured to scan identifying indicia located on the products 190 or on the packaging containing the products 190 and to receive instructions and/or alerts from the electronic inventory management device 150. In some embodiments, the worker electronic device 170 is an electronic hand-held scanner that may be carried by a worker at the product storage facility 180. Examples of suitable worker electronic device 170 may include, but are not limited to barcode readers, RFID readers, SKU readers, electronic tablets, cellular phones, or the like mobile electronic devices.

The identifying indicia on the products 190 that may be scanned by the worker electronic device 170 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes. In some embodiments, the worker electronic device 170 may obtain electronic data associated with the products 190 at the product storage facility 180 by communicating via a communication channel (e.g., radio waves) with a unique identifying indicia (e.g., barcode, RFID (radio frequency identification), or SKU (stock keeping unit number)) on an exterior of the products 190 or on the bins or shelves where the products 190 are stored at the product storage facility 180. Alternatively, electronic data identifying a product 190 at the product storage facility 180 may be manually entered into the worker electronic device 170 by the worker.

In some embodiments, after a product 190 ordered by a customer 110 arrives at the product storage facility 180, a worker at the product storage facility 180 may scan the identifying indicia of the product 190 using the worker electronic device 170 when performing a task related to the product 190 (e.g., binning the product 190). Responsive to this scan, the worker electronic device 170 may transmit electronic data via the network 125 to the electronic inventory management device 150 as to inventory status of the scanned product 190 (e.g., "stored in bin"), as well as the physical location of the storage bin at the product storage facility 180. In response to receiving such electronic data from the worker electronic device 170, the electronic inventory management device 150 will update the inventory management database 160 to indicate the status of the product 190 and the location of the product 190 at the product storing facility 180 to facilitate easy retrieval of the product 190 at a later time by a worker at the product storage facility 180. As such, the inventory management database 160 is updated in real-time to track both the inventory space and the inventory of products 190 at the product storing facility 180.

Since the inventory management database 160 is updated in real-time with respect to the status and location of products 190 at the product storage facility 180, the graphical customer access interface 122 available to a customer 110 on the customer computing device 120 further provides the customer 110 with the ability to track a product 190 the customer 110 purchased from the retailer and now stored at the product order facility 180, for example, track the status, location, and storage conditions of the product 190 at the product storage facility 180. In some embodiments, the graphical customer access interface 122 includes one or more graphical input fields 124 configured to permit the customer 110, by entering information into the graphical input fields 124, to select one or more specific locations at the product storage facility 180 where one or more products purchased by the customer 110 are to be stored, and/or to select a type of storage space (e.g., refrigerator, freezer, ambient, dark, etc.) at the product storage facility 180 for each of the products 190. In addition, in some embodiments, the graphical customer access interface 122 includes one or more input fields 124 configured to permit the customer 110 to access electronic data stored in the inventory management database 160 indicating a location of the product storage facility 180 of the retailer where the products 190 purchased by the customer 110 are stored, and to access electronic data stored in the inventory management database 160 indicating a total number of units of the products 190 purchased by the customer 110 that are stored at a given product storage facility 180 of the retailer.

The graphical customer access interface 122 is not limited to just providing status updates to the customer 110 in relation to the products 190 purchased by the customer 110. In some embodiments, the graphical customer access interface 122 includes one or more input fields 124 configured to permit the customer 110 to permit the customer 110, via entering information into the input fields of the graphical customer access interface, to set various options in relation to the product 190. Such options include but are not limited to: viewing and modifying a delivery list for one or more of the products 190 purchased by the customer 110 from the retailer and stored at the product storage facility 180; selecting delivery (and delivery date) of one or more of the products 190 purchased by the customer 110 from the retailer from the product storage facility 180 to a destination defined by the customer 110; selecting a pick-up date of one or more products 190 purchased by the customer 110 at one or more product storage facilities 180 of the retailer where the products 190 are stored; setting up time intervals for automatic delivery of one or more products 190 ordered by the customer 110 from the product storage facility 180 to the destination defined by the customer 110; and setting up periodic notification alerts to be sent to the customer computing device 120 to remind the customer 110 to arrange for delivery, pick-up, and/or reorder of one or more of the products 190 purchased by the customer 110 and now storage at the product storage facility 180 of the retailer.

The system 100 not only provide a customer 110 with a graphical customer access interface 122, but providers the retailer with a graphical retailer access interface 152 configured to provide the retailer with the ability to set and/or modify multiple options relating to the storage of the products 190 ordered by the customer 110 and stored at the product storage facility 180 of the retailer. The graphical retailer access interface 152 may be accessible via the electronic inventory management device 150 and/or via the worker electronic device 170. In some embodiments, the graphical retailer access interface 152 includes input fields 154 configured to permit the retailer to access the inventory management database 160 to view electronic data associated with the products 190 purchased by the customer 110 and stored at one or more product storage facilities 180 of the retailer. In addition, the graphical retailer access interface 152 includes input fields 154 configured to permit the retailer to set one or more business rules in association with the products 190 purchased by the customer 110 and stored at the product storage facilities 180 of the retailer.

For example, the retailer access interface 152 may include input fields 154 configured to permit the retailer, via entering information into the input fields 154, to set at least one business rule governing pricing, storage requirements, and/or delivery options associated with the products 190 purchased by the customer 110 and stored at one or more product storage facilities 180 of the retailer. For example, a business rule specified by the retailer via the graphical retailer access interface 152 may set the pricing of a product 190 to be based on a total number of units of the products 190 purchased by the customer 110, such that the more units of a product 190 the customer 110 orders from the retailer, the lower the price per unit would be. In some embodiment, the retailer may utilize the graphical retailer access interface 152 to set one or more business rules setting different prices based on a type of product 190 (e.g., flammable, frozen, fresh, perishable, toxic, breakable, etc.) to be stored at the product storage facility 180.

In some embodiments, a business rule specified by the retailer via the graphical retailer access interface 152 may set pricing to be based on availability of storage space within a desired storage area of a product storage facility 180. For example, when a customer 110 agrees that some units of the product 190 ordered by the customer 110 may be stored at different product storage facilities 180 (which may be cost-effective for the retailer in certain situations), the business rule specified by the retailer via the graphical retailer access interface 152 may provide for lower pricing for such a product 190. In some embodiments, to provide for a discount to a customer 110 for driving to pick up products 190 from a product storage facility 180 that is not geographically convenient for the customer 110, a business rule specified by the retailer via the graphical retailer access interface may provide for a price discount to the customer 110 if the customer has to drive a distance that exceeds a certain preset distance value (e.g., 10 miles, 20 miles, 30 miles etc.). When time-sensitive and/or perishable products 190 having expiration dates are stored at the product storage facility 180, the retailer may utilize the graphical retailer access interface 152 to set one or more business rules governing periodic rotation/replacement of the stored products 190 with newer/fresher products 190. Such business rules ensure that the products stored at the product storage facility 180 are fresh and are not past their expiration date.

In some embodiments, the system 100 may include a rules engine configured to control business rules that may be implemented by the retailer and/or the customer 110. The rules engine may, for example, restrict abuse of storage space at a product storage facility 180 and prevent a retailer and/or a customer 110 from setting a business rule that is outside of a permitted rule threshold. The rules engine may also govern situations pertaining to product abandonment by a customer 110, product recall manufacturer, product trades between customers 110, and/or product upgrades by a customer. The rules engine, while providing flexibility to both the retailer and the customer 110 to set a multitude of business rules that may govern the purchase and/or storage of a product purchased by the customer 110 at the product storage facility 180, also ensure that the business rules are within a certain acceptable range.

In some embodiments, each product 190 purchased by customers 110 and stored at the product storage facility 180 of the retailer includes a smart label 195. The smart labels 195 may be configured with various functions that facilitate proper storage of the product 190 at a given product storage facility 180. For example, a smart label 195 may be configured to monitor an expiration date and storage conditions for a product 190 purchased by the customer 110. In some embodiments, a smart label 195 on a product 190 may include one or more sensors that monitors storage conditions of the product 190, including but not limited to temperature, humidity, dust count, pollen count, and/or allergen count. For instance, the smart label 195 may be configured to generate and transmit at least one alert indicating an approaching expiration date, a past expiration date, at least one unacceptable storage condition (e.g., a temperature that is too high or too low), and/or an incorrect storage location or placement at the product storage facility 180 for the product 190 purchased by the customer 110. Such an alert, when generated by the smart label 195, may be transmitted to the worker electronic device 170 at the product storage facility 180 to instruct the worker to remedy the condition giving rise to the alert and/or to the customer computing device 120 of the customer 110 who purchased the product 190.

In response to receiving such an alert from the smart label 195 at his or her worker electronic device 170, the worker at a given product storage facility 180 may then perform a worker task remedying the condition giving rise to the alert. For example, in response to receiving an alert from the smart label that a product 190 has reached its expiration date, the worker may pick the expired product 190 from its storage location and dispose of the expired product 190, then either replacing the expired product 190 at the storage location dedicated to the customer 110 with an unexpired product 190, or to enter a replenishment request via the worker electronic device 170 to request delivery of an unexpired product 190 to the product storage facility 180. The worker tasks of the worker entered via the worker electronic device 170 are communicated via the network 125 to the inventory management database 160 such that the inventory management database 160 may be updated in real time to indicate that an expired one of the products 190 purchased by the customer 110 has been replaced by an identical product 190 having a later expiration date and/or that at a product 190 purchased by the customer 110 and stored in unacceptable storage conditions has been moved to a storage location at the product storage facility 180 having acceptable storage conditions for such a product 190.

In certain situations, after a customer orders multiple units of a product 190 and does not require delivery of the products for a preset period of time (e.g., 1, 2, 3, or 4 weeks), it may be advantageous for the retailer to utilize the units of product 190 stored at the product storage facility 180 for the original customer 110 to sell these units to another customer 110 who purchases the product 190 and indicates an urgent need for delivery of the product 190. In such instances, the retailer is able to sell and deliver the units of product 190 stored at the product storage facility 180 to the other customer 110, and to replenish the sold units of the product 190 by getting additional units of the product 190 delivered to the product storage facility 180. To provide for such situations, the graphical retailer access interface 152 may be configured to permit the retailer to set at least one business rule permitting one or more of the products 190 purchased by the customer 110 and stored at the product storage facility 180 to be delivered to a different customer of the retailer to fulfill an active order for a product 190, and providing for replacement, at the product storage facility 180, of the products 190 purchased by the customer 110 after removal of the original units of the products 190 from the product storage facility 180 and sold and delivered to the different customer 110.

The business rules that may be set by the retailer using the graphical retailer access interface 152 in relation to the products 190 stored at the product storage facility 180 may relate to various aspects of storage of products 190 at the product storage facility 180, delivery of products 190 from the product storage facility 180 to the customer 110, and/or pick-up of the products 190 from the product storage facility 180 by the customer 110. For example, the retailer may utilize the graphical retailer access interface 152 to set business rules relating to temperature requirements of various products 190 to be stored at the product storage facility 180. For example, the retailer may set business rules permitting products 190 that must be frozen and/or refrigerated during storage to be stored at a given product storage facility 180. By the same token, a business rule prohibiting storage of such products 190 at one or more product storage facilities 180 may be set by the retailer using the graphical retailer access interface 152.

In some embodiments, the retailer may utilize the graphical retailer access interface 152 to set business rules enabling or prohibiting pick up of products 190 by the customer 110 from a given product storage facility 180. In other words, some product storage facilities 180 may be designated by a business rule to be delivery-only, with no in-person pick up allowed. For product storage facilities 180 where in-person pick up by customers 110 is permitted, the retailer may utilize the graphical retailer access interface 152 to set business rules designating certain areas of the product storage facility 180 as secure areas inaccessible by the customers 110 and/or to designate certain areas of the product storage facility 180 as permitting customer-only access.

In some embodiments, the system 100 includes one or more devices configured to pick one or more products 190 from one or more storage shelves at the product storage facility 180 and to load the products 190 picked from one or more shelves at the product storage facility 180 into a delivery vehicle tasked with delivering the products 190 to the customer 110. In other embodiments, the system 100 includes one or more devices configured to pick one or more products 190 from one or more storage shelves at the product storage facility 180 and to place the products 190 picked from one or more shelves at the product storage facility 180 in a product pick up area designated by the customer 110 for picking up the products 190. Such devices may include but are not limited to robotic picking arms, conveyors, and the like.

In some embodiments, the system 100 may be available to and accessible by the customers 110 and retailers via desktop-based computing devices using desktop-based (e.g., Windows or Mac) operating systems, or via mobile-based computing devices using mobile-based operating systems such as IOS and Android. For example, a customer 110 having a previously established account with a retailer may initially connect to the order processing server 130 of the system 100 using the customer computing device 120 via a dot.com access (e.g., via the retailer's dedicated website) by using a unique identification (e.g., login/password combination) to gain access to the graphical customer access interface 122. Similarly, the retailer may connect to the system 100 using a login/password combination entered into the electronic inventory management device 150 to gain access to the graphical retailer access interface 152.

In some embodiments, when a customer 110 initially sets up an online account with the retailer, the system 100 (i.e., order processing server 130 or another server on the system 100 dedicated to new customer sign-up) is configured to permit the customer 110 to generate a customer profile including personal information of the customer 110 (e.g., name, address, phone number, and the like), payment methods (e.g., credit card information), as well as product storage and/or delivery settings of the customer 110 (e.g., storage temperatures, time intervals for delivery of products, etc.). It will be appreciated that the customer 110 may select new options and/or update previously selected options at any time after setting up the account with the retailer. In some embodiments, the personal information of the customer 110 and any product storage and/or delivery options selected by the customer 110 are stored in the customer information database 140 and/or inventory management database 160 for subsequent retrieval by the order processing server 130 (e.g., in response to a login request or product order placement by the customer 110).

In some embodiments, as the customer 110 is connecting to the retailer's website (e.g., via a login interface), the order processing server 130 may request a verification of the identity (e.g., username/password) of the customer 110. The order processing server 130 may first verify the identity of the customer 110 (e.g., by comparing the username/password data entered by the customer 110 into the login interface against username/password data in the profile of the customer 110 stored in the customer information database 140). The order processing server 130 may then associate the customer profile with the identity of the customer 110, retrieve the customer profile from the customer information database 140 based on information stored in the profile, and send the retrieved customer account information to the above-described software-implemented graphical retailer access interface 152 that is displayed to the customer 110 on the customer computing device 120 and which permits the customer 110 to customize various options relating to the ordering of products 190 from the retailer and storage of the purchased products at the product storage facility 180.

Figure 3:
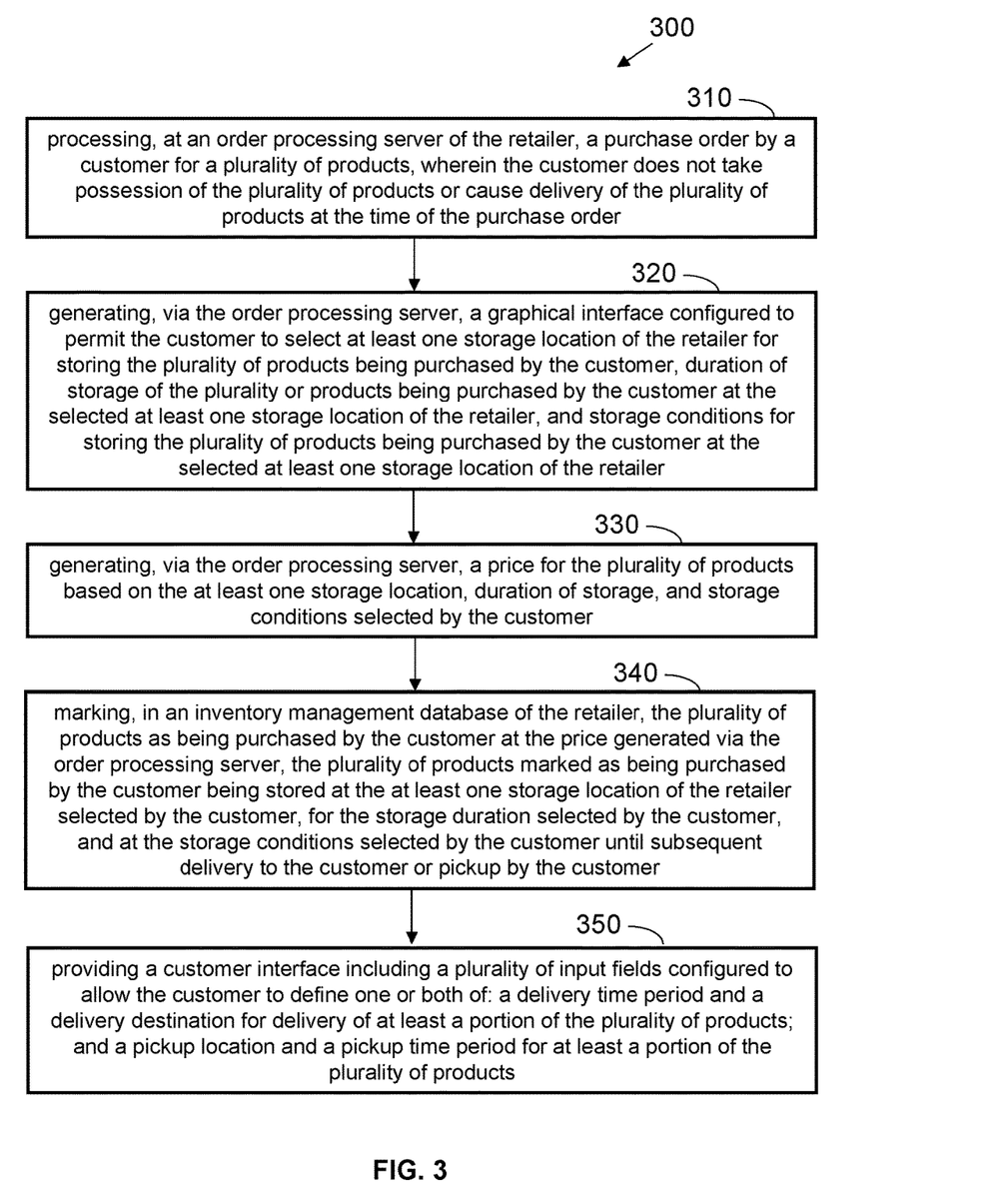
FIG. 3 is a flow chart diagram of a process of managing inventory of products purchased by a customer from a retailer and stored by the retailer for the customer in accordance with some embodiments.

FIG. 3 shows an exemplary method 300 of managing inventory of products 190 purchased by a customer 110 from a retailer. After a customer 110 purchases one or more products 190 from the retailer via an order processing server 130 of the retailer, the method 300 includes processing, at the order processing server 130 of the retailer, the purchase order of the customer 110 for the one or more products 190 (step 310). In the exemplary method 300 shown FIG. 3, the customer 110 does not take possession of the products 190 or cause delivery of the products 190 at the time of the purchase order (step 310). Instead, as described above, the one or more products 190 purchased by the customer are stored at one or more product storage facilities 180 of the retailer in accordance with one or more business rules set by the customer 110 and/or the retailer.

In some embodiments, as the customer 110 is attempting to place an order for one or more products 190 via the order processing server 130, the system 100 generates a graphical interface that enables the customer 110 to select various parameters associated with storage of the products 190 being purchased by the customer 110. To that end, the exemplary method 300 shown in FIG. 3 includes generating, via the order processing server 130, a graphical interface configured to permit the customer 110 to select at least one storage location (i.e., product storage facility 180) of the retailer for storing the plurality of products 180 being purchased by the customer 110, duration of storage of the plurality or products being purchased by the customer at the selected at least one storage location of the retailer, and storage conditions for storing the plurality of products being purchased by the customer at the selected at least one storage location of the retailer (step 320). In one aspect, such a graphical interface is generated by the order processing server 130 via electronic data transmitted to the order processing server 130 over the network 125 by the electronic inventory management device 150.

In some aspects, after the customer 110 is permitted to select one or more storage locations 180, the required duration of storage of the products 190 at the storage locations 180, and the required storage conditions for the products 190, the control circuit 210 of the electronic inventory management device 150 analyzes the product storage parameters selected by the customer and generates a price for the products 190 based on these parameters. To that end, the exemplary method 300 of FIG. 3 includes generating, via the order processing server 130, a price for the plurality of products 190 based on the at least one storage location 180, duration of storage, and storage conditions selected by the customer 110 (step 330). After the purchase order of the customer 110 for one or more products 190 is processed at the order processing server 130, the exemplary method 300 further includes marking, in an inventory management database 160 of the retailer, the plurality of products 190 as being purchased by the customer 110 at the price generated via the order processing server 130, the plurality of products 190 marked as being purchased by the customer 110 being stored at the at least one storage location 180 of the retailer selected by the customer 110, for the storage duration selected by the customer 110, and at the storage conditions selected by the customer 110 until subsequent delivery to the customer 110 or pickup by the customer 110 (step 340). As discussed above, the customer 110 may define a specific date on which the products 190 purchased by the customer 110 and stored at the product storage facility 180 are to be delivered from the product storage facility 180 to the customer 110 or picked up from the product storage facility 180 by the customer 110, or may set predefined intervals at which a certain number of units of a given product 190 are to be delivered from the product storage facility 180 to the customer 110 or picked up from the product storage facility 180 by the customer 110.

As discussed above, the customer 110 may set and modify storage and delivery options for the products 190 purchased by the customer 110 from the retailer and stored at the product storage facility 180 of the retailer using a graphical interface provided on the customer computing device 120. To that end, the exemplary method 300 further includes providing a graphical customer access interface 122 including a plurality of input fields 124 configured to allow the customer 110 to define one or both of: a delivery time period and a delivery destination for delivery of at least a portion of the products 190 purchased by the customer 110; and a pickup location and a pickup time period for at least a portion of the products 190 purchased by the customer (step 350). As discussed above, the graphical customer access interface 122 includes a plurality of input fields 124 configured to permit the customer 110 to select one or more storage locations 180 where the products 190 being purchased are to be stored, the required duration of storage of the products 190 at the storage locations 180, the required storage conditions for the products 190, a type of product 190 being purchased, a number of units of each product 190 being purchased, and a delivery (e.g., truck, unmanned aerial vehicle, etc.) and/or pick up method (e.g., store, locker, etc.) for the products 190. As discussed above, the retailer is also provided with a graphical retailer access interface (accessible, for example, via the electronic inventory management device 150) that permits the retailer to implement various business rules associated with the storage of products 190 purchased by the customer 110 at product storage facility 180.

The systems and methods described herein advantageously allow customers to purchase products from a retailer and have a virtual on-hand inventory of products without having to physically store the purchased products at their facilities. Instead, the purchased products are advantageously stored at one or more product storage facilities of the retailer. The customers are provided with a graphical customer access interface that permits the customers to manage the storage and delivery options for the products, enabling the customers to set suitable storage conditions and spaces for their products, get on-demand or periodic delivery of the products from the product storage facility to the customer, and to set replenishment conditions for the products stored at the product storage facilities. This provides a significant operation cost reduction for the customers, and increases customer return and profits for the retailers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of managing an inventory of products purchased by a customer from a retailer, the system comprising:
an order processing server of the retailer configured to process a purchase order by a customer for a plurality of products, wherein the customer does not take possession of the plurality of products or cause delivery of the plurality of products at the time of the purchase order;
wherein the order processing server is configured to:
generate a graphical interface configured to permit the customer to select at least one storage location of the retailer for storing the plurality of products being purchased by the customer, duration of storage of the plurality of products being purchased by the customer at the selected at least one storage location of the retailer, and storage conditions for storing the plurality of products being purchased by the customer at the selected at least one storage location of the retailer; and
display in the graphical interface, a price for the plurality of products based on the at least one storage location, duration of storage, and storage conditions selected by the customer;
an inventory management database configured to:
store electronic data associated with the plurality of products purchased by the customer, the plurality of products purchased by the customer at the price generated by the order processing server being marked in the inventory management database of the retailer as being purchased by the customer, the plurality of products marked as being purchased by the customer being stored at the at least one storage location of the retailer selected by the customer, for the storage duration selected by the customer, and at the storage conditions selected by the customer until subsequent delivery to the customer or pickup by the customer;
store electronic data indicating a real-time inventory of all storage space at the at least one storage location; and store electronic data representing a real-time listing of all available storage space at the at least one storage location;

an electronic inventory management device including a programmable processor and configured, prior to the order processing server permitting the customer to select the at least one storage location of the retailer for storing the plurality of products being purchased by the customer and prior to the order processing server displaying the price in the graphical interface, to:

receive a product storage request of the customer from the order processing server;

transmit a query to the inventory management database to obtain from the inventory management database the real-time listing of all of the available storage space at the at least one storage location;

analyze the real-time listing of all of the available storage space at the at least one storage location obtained from the inventory management database to identify the at least one storage location that matches the duration of storage and the storage conditions selected by the customer; and based on the identified at least one storage location that matches the duration of storage and the storage conditions selected by the customer, generate the price for the products to be stored at the identified at least one storage location, and transmit the generated price to the order processing server for displaying in the graphical interface; and a customer access interface including a plurality of input fields configured to allow the customer to define one or both of:

a delivery time period and a delivery destination for delivery of at least a portion of the plurality of products; and a pickup location; and a pickup time period for at least a portion of the plurality of products.

2. The system of claim 1, wherein the customer interface includes at least one input field configured to permit the customer, via entering information into the at least one field of the customer interface, to select a product type associated with the plurality of products being purchased by the customer, the product type being selected from a group consisting of frozen, fresh, perishable, toxic, flammable, and breakable, and wherein the order processing server is further configured to generate the price for the plurality of products based on the product type being purchased by the customer.

3. The system of claim 1, wherein the customer interface includes at least one input field configured to permit the customer, via entering information into the at least one input field of the customer interface, to access electronic data stored in the inventory management database and indicating a location of the at least one storage location of the retailer where the plurality of products purchased by the customer are stored, and to access electronic data stored in the inventory management database and indicating a total number of units of the products purchased by the customer that are stored at the at least one storage location of the retailer.

4. The system of claim 1, wherein the customer interface includes at least one input field configured to permit the customer, via entering information into the at least one input field of the customer interface, to at least one of: view and modify a delivery list for the at least a portion of the plurality of products purchased by the customer from the retailer; select delivery of the at least a portion of the plurality of products purchased by the customer from the retailer from the at least one storage location of the retailer to the delivery destination defined by the customer; and select pick-up of the at least a portion of the plurality of products purchased by the customer from the retailer at the one or more storage locations of the retailer.

5. The system of claim 1, wherein the customer interface includes at least one input field configured to permit the customer, via entering information into the at least one input field of the customer interface, to at least one of: set up time intervals for automatic delivery of the at least a portion of the plurality of products purchased by the customer from the retailer from the at least one storage location of the retailer to the destination defined by the customer; enable automatic reordering of the at least a portion of the plurality of products delivered from the at least one storage location of the retailer to the destination defined by the customer; and set-up periodic notification alerts to be sent to an electronic device of the customer to remind the customer to arrange for delivery, pick-up, and reorder of the at least a portion of the plurality of products purchased by the customer from the retailer.

6. The system of claim 1, further comprising a retailer access interface, the retailer access interface including a plurality of input fields configured to permit the retailer to at least one of: access the inventory management database to view the electronic data associated with the plurality of products purchased by the customer and stored at the at least one storage location of the retailer; and to set at least one business rule in association with the plurality of products purchased by the customer and stored at the at least one storage location of the retailer.

7. The system of claim 1, further comprising a retailer access interface, wherein the retailer access interface includes at least one input field configured to permit the retailer, via entering information into the at least one input field of the retailer access interface, to set at least one business rule governing pricing for the plurality of products purchased by the customer and stored at the at least one storage location of the retailer, the pricing being based on the at least one storage location, duration of storage, and storage conditions selected by the customer for the plurality of products being purchased by the customer and at least one of a total number of units of the products being purchased by the customer and delivery options associated with the plurality of products being purchased by the customer.

8. The system of claim 1, further comprising a retailer access interface, wherein the retailer access interface at least one input field configured to permit the retailer, via entering information into the at least one input field of the retailer access interface, to set at least one business rule permitting at least one of the plurality of products purchased by the customer and stored at the at least one storage location of the retailer to be delivered to a different customer of the retailer to fulfill an active product order, the business rule providing for replacement at the at least one storage location of the retailer of the at least one of the plurality of products purchased by the customer after removal of the at least one of the plurality of products purchased by the customer for delivery to the different customer.

9. The system of claim 1, further comprising at least one smart label on the plurality of products purchased by the customer and stored at the at least one storage location of the retailer, the at least one smart label being configured to: monitor an expiration date and storage conditions for the plurality of products purchased by the customer, the storage conditions including temperature, humidity, dust count, pollen count, and allergen count; and to generate and transmit at least one alert indicating an approaching expiration date for the plurality of products purchased by the customer, a past expiration date for the plurality of products purchased by the customer, and at least one unacceptable storage condition for the plurality of products purchased by the customer.

10. The system of claim 1, wherein the retailer access interface includes at least one input field configured to permit the retailer, via entering information into the at least one input field of the retailer access interface, and in response to receiving the at least one alert from the at least one smart label, to update the inventory management database with electronic data indicating that an expired one of the plurality of products purchased by the customer has been replaced by an identical product having a later expiration date, and that at least one of the plurality of products purchased by the customer and stored in the at least one unacceptable storage condition has been moved to a storage location having acceptable storage conditions for the at least one of the plurality of products purchased by the customer.

11. A method of managing an inventory of products purchased by a customer from a retailer, the method comprising:

processing, at an order processing server of the retailer, a purchase order by a customer for a plurality of products, wherein the customer does not take possession of the plurality of products or cause delivery of the plurality of products at the time of the purchase order;

generating, via the order processing server, a graphical interface configured to permit the customer to select at least one storage location of the retailer for storing the plurality of products being purchased by the customer, duration of storage of the plurality of products being purchased by the customer at the selected at least one storage location of the retailer, and storage conditions for storing the plurality of products being purchased by the customer at the selected at least one storage location of the retailer;

displaying, via the order processing server and in the graphical interface, a price for the plurality of products based on the at least one storage location, duration of storage, and storage conditions selected by the customer;

marking, in an inventory management database of the retailer, the plurality of products as being purchased by the customer at the price generated via the order processing server, the plurality of products marked as being purchased by the customer being stored at the at least one storage location of the retailer selected by the customer, for the storage duration selected by the customer, and at the storage conditions selected by the customer until subsequent delivery to the customer or pickup by the customer;

storing, in the inventory management database, electronic data indicating a real-time inventory of all storage space at the at least one storage location and electronic data representing a real-time listing of all available storage space at the at least one storage location;

providing an electronic inventory management device including a programmable processor;

prior to the order processing server permitting the customer to select the at least one storage location of the retailer for storing the plurality of products being purchased by the customer and prior to the order processing server displaying the price in the graphical interface:

receiving, at the inventory management device, a product storage request of the customer from the order processing server;

transmitting, from the inventory management device, a query to the inventory management database to obtain from the inventory management database the real-time listing of all of the available storage space at the at least one storage location;

analyzing, via the processor of the inventory management device, the real-time listing of all of the available storage space at the at least one storage location obtained from the inventory management database to identify the at least one storage location that matches the duration of storage and the storage conditions selected by the customer; and based on the identified at least one storage location that matches the duration of storage and the storage conditions selected by the customer, generating, via the processor of the inventory management device, the price for the products to be stored at the identified at least one storage location, and transmitting the generated price from the inventory management device to the order processing server for displaying in the graphical interface; and providing a customer interface including a plurality of input fields configured to allow the customer to define one or both of:

a delivery time period and a delivery destination for delivery of at least a portion of the plurality of products; and a pickup location and a pickup time period for at least a portion of the plurality of products.

12. The method of claim 11, further comprising permitting the customer, via entering information into at least one of the input fields of the customer interface, to select a product type associated with the plurality of products being purchased by the customer, the product type being selected from a group consisting of frozen, fresh, perishable, toxic, flammable, and breakable, and further comprising, generating, via the order processing server, the price for the plurality of products based on the product type being purchased by the customer.

13. The method of claim 11, further comprising permitting the customer, via entering information into at least one of the input fields of the customer interface, to access electronic data stored in the inventory management database and indicating a location of the at least one storage location of the retailer where the plurality of products purchased by the customer are stored, and to access electronic data stored in the inventory management database and indicating a total number of units of the products purchased by the customer that are stored at the at least one storage location of the retailer.

14. The method of claim 11, further comprising permitting the customer, via entering information into at least one of the input fields of the customer interface, to at least one of: view and modify a delivery list for the at least a portion of the plurality of products purchased by the customer from the retailer; select delivery of the at least a portion of the plurality of products purchased by the customer from the retailer from the at least one storage location of the retailer to the delivery destination defined by the customer; and select pick-up of the at least a portion of the plurality of products purchased by the customer from the retailer at the at least one storage location of the retailer.

15. The method of claim 11, further comprising permitting the customer, via entering information into at least one of the input fields of the customer interface, to at least one of: set up time intervals for automatic delivery of the at least a portion of the plurality of products purchased by the customer from the retailer from the at least one storage location of the retailer to the destination defined by the customer; enable automatic reordering of the at least a portion of the plurality of products delivered from the at least one storage location of the retailer to the destination defined by the customer; and set-up periodic notification alerts to be sent to an electronic device of the customer to remind the customer to arrange for delivery, pick-up, and reorder of the at least a portion of the plurality of products purchased by the customer from the retailer.

16. The method of claim 11, further comprising providing a retailer access interface, the retailer access interface including a plurality of input fields configured to permit the retailer to at least one of: access the inventory management database to view the electronic data associated with the plurality of products purchased by the customer and stored at the at least one storage location of the retailer; and to set at least one business rule in association with the plurality of products purchased by the customer and stored at the at least one storage location of the retailer.

17. The method of claim 11, further comprising permitting the retailer, via entering information into at least one of the input fields of the retailer access interface, to set at least one business rule governing pricing for the plurality of products purchased by the customer and stored at the at least one storage location of the retailer, the pricing being based on the at least one storage location, duration of storage, and storage conditions selected by the customer for the plurality of products being purchased by the customer and at least one of a total number of units of the products being purchased by the customer and delivery options associated with the plurality of products being purchased by the customer.

18. The method of claim 11, further comprising permitting the retailer, via entering information into at least one of the input fields of the retailer access interface, to set at least one business rule permitting at least one of the plurality of products purchased by the customer and stored at the at least one storage location of the retailer to be delivered to a different customer of the retailer to fulfill an active product order, the business rule providing for replacement at the at least one storage location of the retailer of the at least one of the plurality of products purchased by the customer after removal of the at least one of the plurality of products purchased by the customer for delivery to the different customer.

19. The method of claim 11, further comprising providing at least one smart label on the plurality of products purchased by the customer and stored at the at least one storage location of the retailer, the at least one smart label being configured to: monitor an expiration date and storage conditions for the plurality of products purchased by the customer, the storage conditions including temperature, humidity, dust count, pollen count, and allergen count; and to generate and transmit at least one alert indicating an approaching expiration date for the plurality of products purchased by the customer, a past expiration date for the plurality of products purchased by the customer, and at least one unacceptable storage condition for the plurality of products purchased by the customer.

20. The method of claim 19, further comprising, permitting the retailer, via entering information into at least one of the input fields of the retailer access interface, and in response to receiving the at least one alert from the at least one smart label, to update the inventory management database with electronic data indicating that an expired one of the plurality of products purchased by the customer has been replaced by an identical product having a later expiration date, and that at least one of the plurality of products purchased by the customer and stored in the at least one unacceptable storage condition has been moved to a storage location having acceptable storage conditions for the at least one of the plurality of products purchased by the customer.

* * * * *